United States Patent [19]
Yaji

[11] Patent Number: 5,732,292
[45] Date of Patent: Mar. 24, 1998

[54] FOCUS DETECTION APPARATUS FOR INTERPOLATING CORRELATION VALUE BETWEEN TWO IMAGES AND SELF-CORRELATION VALUE OF EITHER IMAGE

[75] Inventor: Tsuyoshi Yaji, Kawagoe, Japan

[73] Assignee: Olympus Optical Co., Ltd., Tokyo, Japan

[21] Appl. No.: 768,670

[22] Filed: Dec. 18, 1996

Related U.S. Application Data

[63] Continuation of Ser. No. 433,549, May 3, 1995, abandoned.

[30] Foreign Application Priority Data

May 11, 1994 [JP] Japan ................................. 6-097421

[51] Int. Cl.[6] .................................................. G01J 1/20
[52] U.S. Cl. .................... 396/128; 396/125; 396/114; 396/96; 396/121; 250/201.8
[58] Field of Search .......................... 396/125–128, 396/114, 121, 124; 250/234, 104, 96, 201.8; 341/353, 356

[56] References Cited

U.S. PATENT DOCUMENTS

| | | |
|---|---|---|
| 4,561,749 | 12/1985 | Utagawa . |
| 4,734,571 | 3/1988 | Hamada et al. . |
| 5,333,028 | 7/1994 | Akashi et al. ............... 250/201.8 |
| 5,422,701 | 6/1995 | Utagawa ........................ 354/406 |
| 5,424,528 | 6/1995 | Goto ................................ 354/408 |
| 5,469,528 | 11/1995 | Uchiyama et al. ............ 354/406 |
| 5,483,318 | 1/1996 | Hamada et al. ............... 354/408 |
| 5,483,336 | 1/1996 | Tocher ......................... 250/201.8 |
| 5,485,003 | 1/1996 | Kusada ....................... 250/201.8 |

FOREIGN PATENT DOCUMENTS 59-126517   7/1984   Japan .

Primary Examiner—Safet Metjahic
Assistant Examiner—Michael Palakis
Attorney, Agent, or Firm—Frishauf, Holtz, Goodman, Langer & Chick

[57] ABSTRACT

A light beam passing a photographing lens is divided into two portions by a mirror in a camera body. One of the two divided light beams is directed to an eyepiece via a screen and pentagonal prism. The other divided light beam is reflected from a mirror and directed to a focus detection optical system constructed by a field view diaphragm, condenser lens, diaphragm mask and re-imaging lens, and an image in position corresponding to the range-finding field view is divided into two images by the optical system. An image sensor is arranged near the re-imaging surface which receives the two images formed by the focus detection optical system to photoelectrically convert a received signal and transfer data to a CPU. The CPU effects the focus detection operation containing the operation of interpolating the value of correlation between the two images by use of the self-correlation value of one of the two images based on detection data and drives the photographing lens to a focused position.

28 Claims, 8 Drawing Sheets

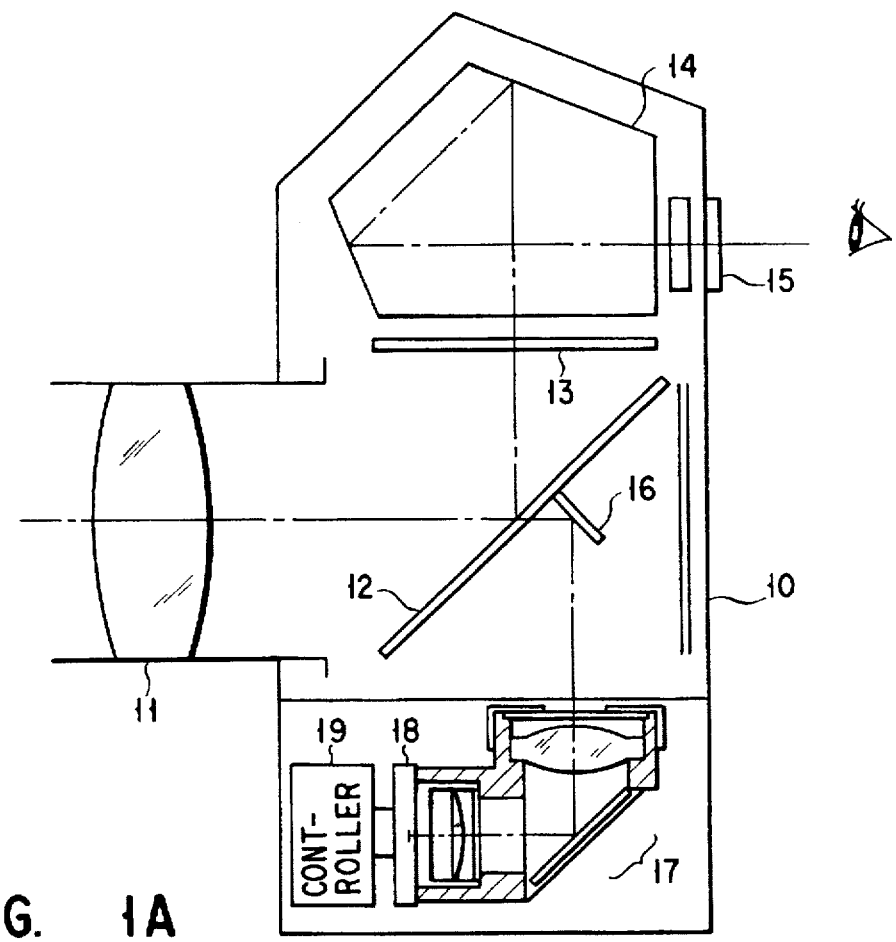
F I G. 1A
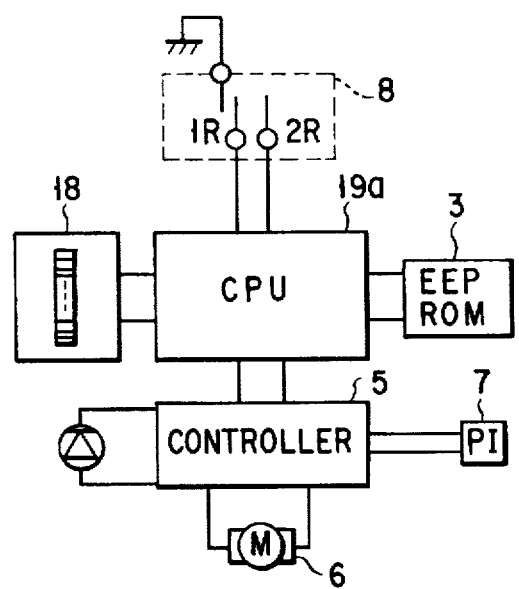
F I G. 1B

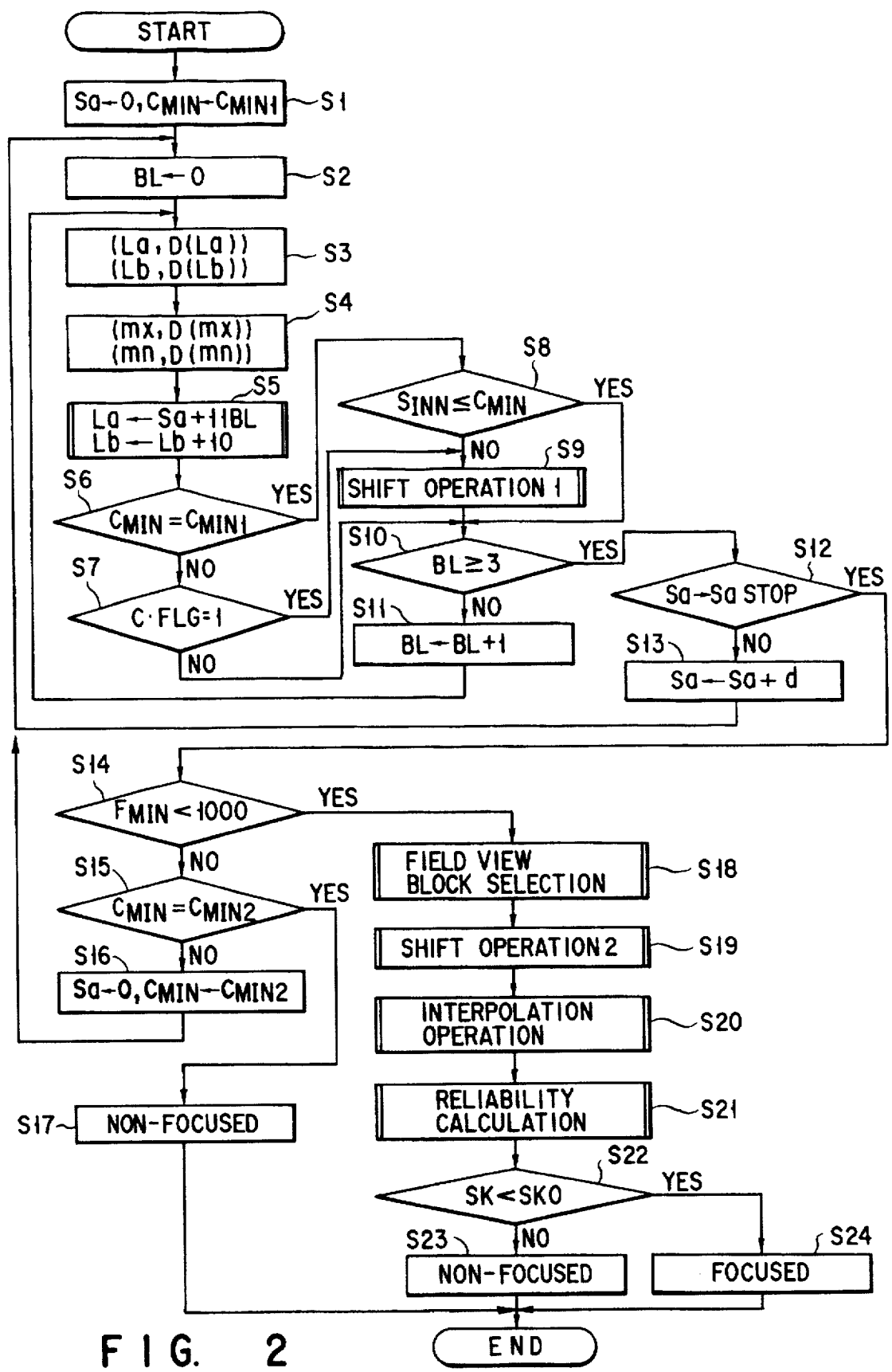
F I G. 2

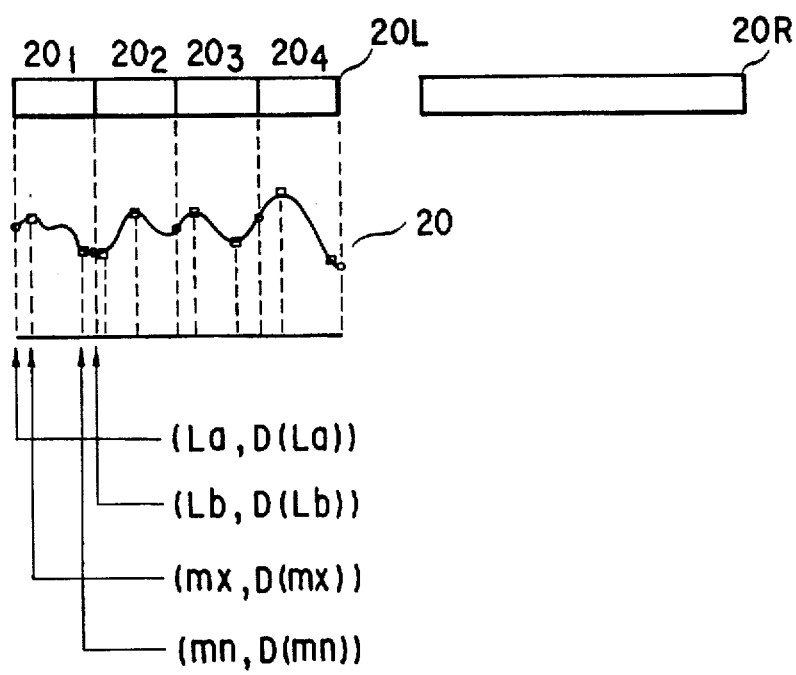
F I G. 3
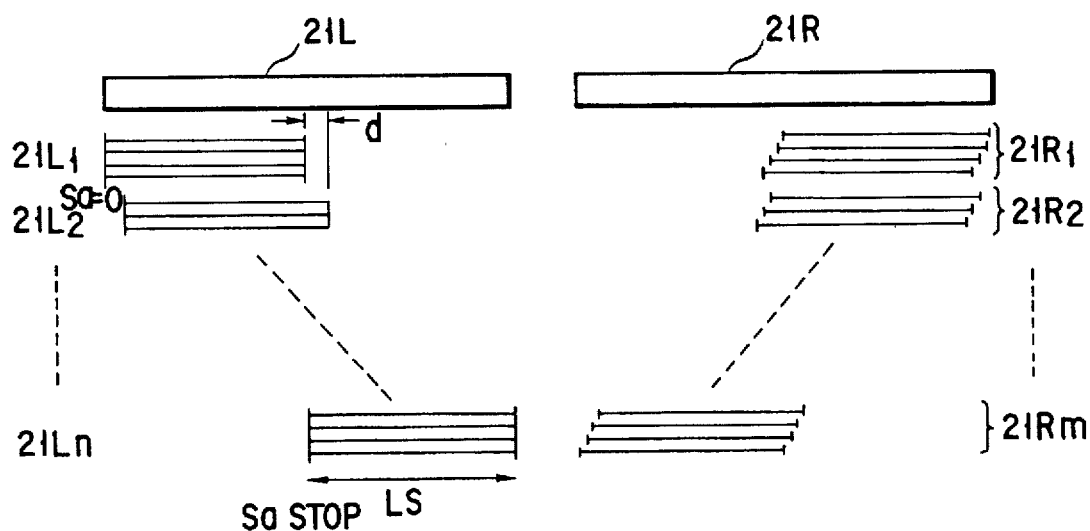
F I G. 4

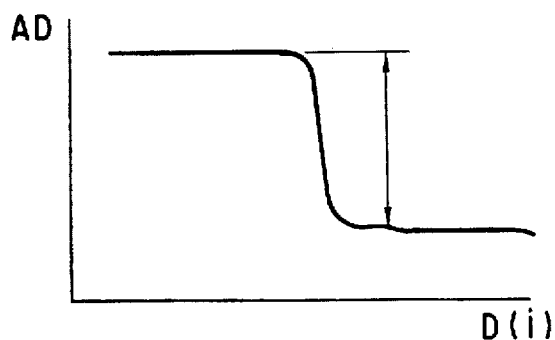
F I G. 5A
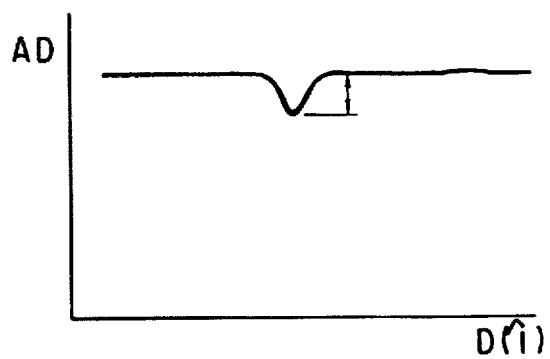
F I G. 5B
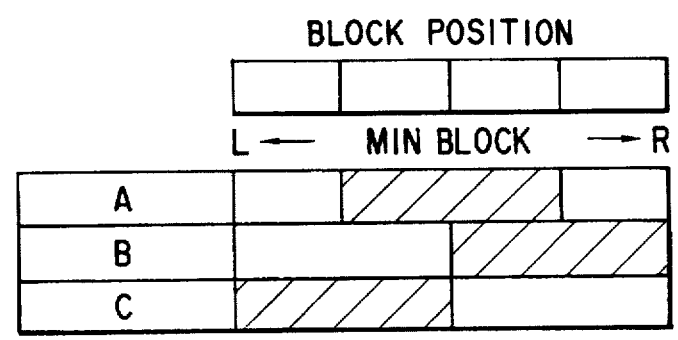
F I G. 6

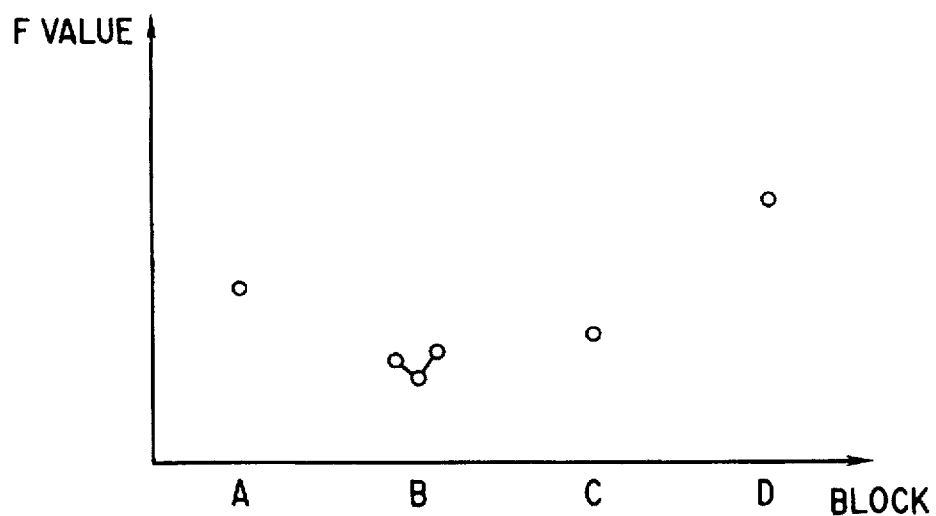
F I G. 7A
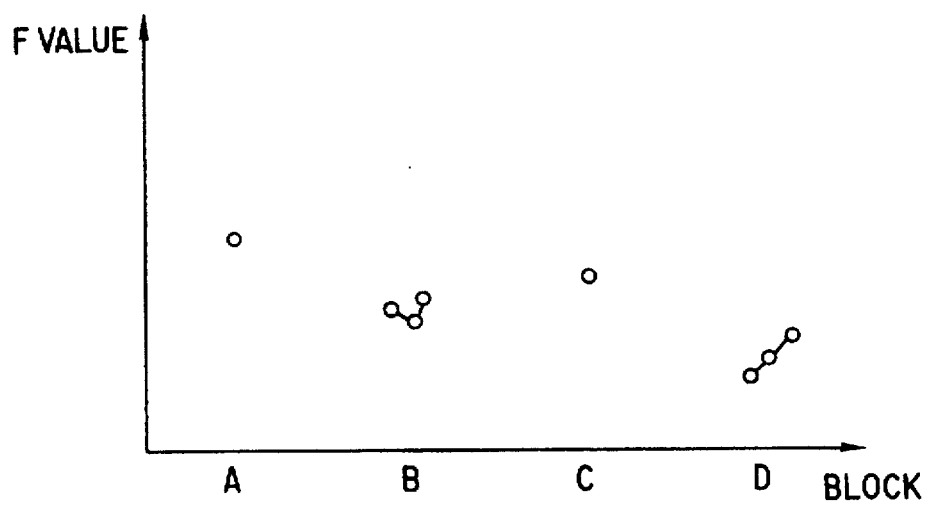
F I G. 7B $$SK = \frac{F_{MIN} + F_P}{F_M - F_{MIN}}$$

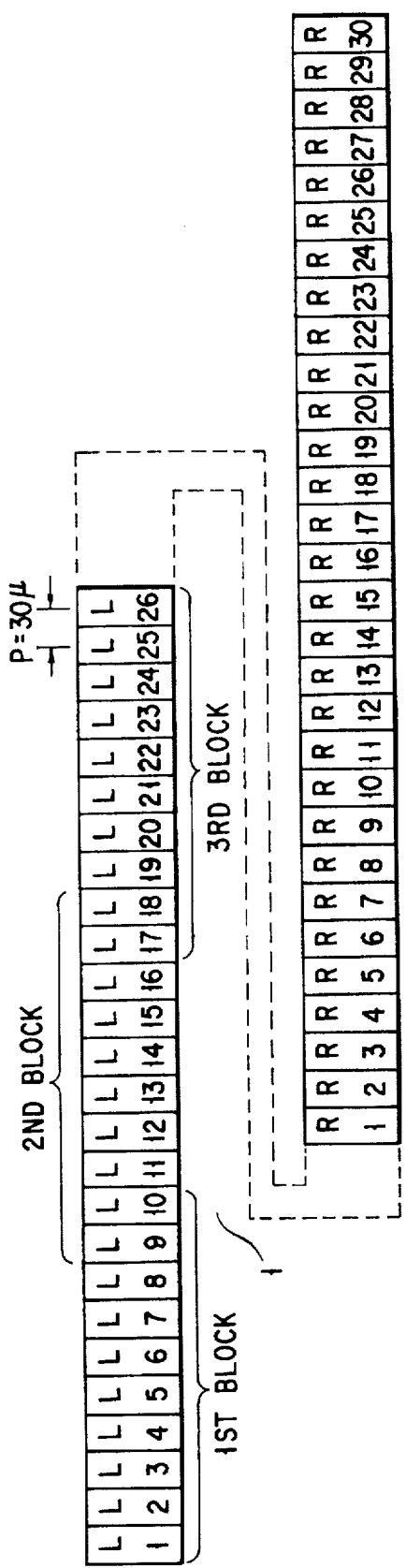
FIG. 11 (PRIOR ART)
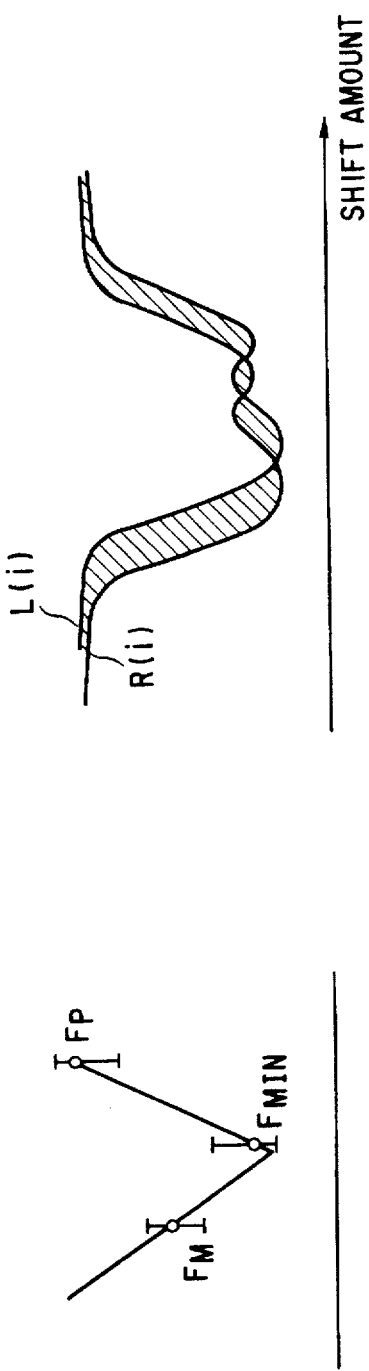
FIG. 12A (PRIOR ART)
FIG. 12B (PRIOR ART)

FOCUS DETECTION APPARATUS FOR INTERPOLATING CORRELATION VALUE BETWEEN TWO IMAGES AND SELF-CORRELATION VALUE OF EITHER IMAGE

This application is a Continuation of application Ser. No. 08/433,549, filed May 3, 1995, now abandoned.

Background of the Invention

1. Field of the Invention

This invention relates to a focus detection apparatus used in a camera, for example, and more particularly to a focus detection apparatus for interpolating a correlation value between two images by use of the result of self-correlation of either image.

2. Description of the Related Art

Conventionally, as an automatic focus detection method for a camera, a so-called phase-difference type focus detection method of detecting a light beam from an object based on an amount of deviation between two images passing different pupils is known. For example, according to Jpn. Pat. Appln. KOKAI Publication No. 59-126517, the following method is disclosed. That is, as shown in FIG. 11, picture elements L1 to L26 of a line sensor 1 used as a standard portion which are contained in the picture elements (L1 to L26) and (R1 to R30) arranged on a pair of line sensors 1 and 2 are divided into three blocks L1 to L10, L9 to L18, and L17 to L26 with a plurality of picture elements (in this example, two picture elements) overlapped in the boundary portion thereof, and the contrast of each of the blocks given by one of two images formed on the blocks is derived. Then, the similarity between an image signal of a block whose contrast is high in the line sensor 1 used as the standard portion and a signal obtained by the other of the two images formed on a corresponding portion of the line sensor 2 used as a reference portion is derived by the operation of correlation.

In this method, since a high-contrast portion is first detected from the line sensor 1 used as the standard portion and the correlation operation is effected only for the high-contrast portion and a corresponding portion of the line sensor 2 used as the reference portion, time for the operation can be made short.

Further, as shown in FIGS. 12A and 12B, the result of focus detection at this time is obtained by effecting the process for deriving the point of the picture element giving the largest similarity between two images or the smallest amount of deviation between the two images based on an evaluation value of the total sum of differences between data items L(i) of the line sensor 1 used as the standard portion and data items R(i) of the line sensor 2 used as the reference portion as indicated by the following equation and effecting the interpolation operation based on data items of three points containing two points before and after the above point of the picture element so as to enhance the precision of focus detection.

$F(S) = \Sigma |L(i+S) - R(i+S)|$ (S: the shift amount of picture element)

That is, if the cross-correlation between the data columns L(i) and R(i) in the field of view is derived, the relative position in which a value corresponding to the total sum of differences caused by the amounts of deviation expressed by the hatched portion as shown in FIG. 12B is set to minimum is derived, the minimum value is set to $F_{MIN}$, the correlation value in position shifted from the point of minimum value by an amount of +1 picture element is set to $F_P$, and the correlation value in position shifted from the point of minimum value by an amount of −1 picture element is set to $F_M$, then the relation shown in FIG. 12A is obtained.

If it is supposed that the three points vary substantially linearly and symmetrically in an area near the focused point, that is, $F_{MIN}$, a distance ZR between the two images giving $F_{MIN}$ can be derived as follows if the reference distance between the two images is set to $ZR_0$.

In the case of $F_M \leq F_P$, $ZR = ZR_0 - 0.5 \times (F_P - F_M)/(F_P - F_{MIN})$.

In the case of $F_M > F_P$, $ZR = ZR_0 + 0.5 \times (F_M - F_P)/(F_M - F_{MIN})$.

However, according to the above-described conventional method, a problem occurs when the satisfactory focus detection can be obtained even in the wide field of view, that is, when the operation is effected for the line sensor having a large number of picture elements.

In the case of wide visual field, a distance view and a close-range view tend to be present in the same visual field, that is, a state in which a distance view and a close-range view are present at the same time tends to occur. In order to cope with this, the size of the standard block is made small in the conventional case. However, when the operation of correlation for checking the similarity with the reference portion is effected, the correlation operation of an amount corresponding to the defocus amount is necessary even if the standard block is small and the operation must be effected for the entire defocus range. As a result, time for the operation becomes relatively longer.

In contrast, it is considered to effect the operation with data intermittently removed, but if the data is intermittently removed, the precision of the operation is lowered and the reliability thereof is lowered.

Further, in the conventional case described above, a block of the highest contrast is selected from a plurality of blocks of the standard portion and the operation of correlation between the selected block and the reference portion is effected. At this time, if no contrast is obtained or the contrast is extremely low, it becomes difficult to check the correlation between the two images, and therefore, the correlation by contrast cannot always be perfectly satisfied.

That is, the similarity between two images can be obtained for a position in which the highest correlation is obtained and the focusing result cannot always be obtained from a position of the block having the highest contrast depending on the condition of the object. This is especially true when the specification of the focus detection apparatus is made for wide visual field.

Further, the precision of the result of the interpolation operation is lowered when the reliability of data is low since data items of the above three points contain an error caused by an error contained in the original data in addition to a difference between the standard portion and the reference portion by the operation of correlation.

SUMMARY OF THE INVENTION

It is, therefore, an object of the present invention to provide a new and improved focus detection apparatus in which the focus detection with high precision can be attained even when the condition of an object is bad, the focusing result can be rapidly obtained according to the condition of the object, and the focus detection can be effected irrespective of information of the object containing a distant view and close-range view even in the wide visual field.

According to an aspect of the present invention, there is provided a focus detection apparatus for a camera including optical means for directing a light beam from an object passing a photographing optical system to form first and second images on a preset surface and photoelectric conversion means disposed on the preset surface, for receiving the two images and outputting two image signals corresponding to the two images with the two images arranged in a preset direction, comprising first operation means for deriving an amount of deviation between the two images by effecting the operation of correlation between the two image signals from the photoelectric conversion means while roughly and sequentially shifting the two images in the arrangement direction in the first cycle and effecting the operation of correlation in a limited range in the next cycle; second operation means for deriving a self-correlation value of one of the two image signals from the photoelectric conversion means; and third operation means for interpolating an amount of deviation between the two images based on at least a portion giving the minimum value of the operation result by the first operation means and the operation result by the second operation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a construction view of a camera using a focus detection apparatus according to one embodiment of this invention;

FIG. 1B is a block diagram concretely showing a controller of FIG. 1A;

FIG. 2 is a flowchart for illustrating the operation effected after a microcomputer (CPU) shown in FIG. 1B and the controller receive sensor output data in the camera of FIG. 1A until the focus detection result is obtained;

FIG. 3 is a diagram showing a sensor block of a solid-state camera device 18 of FIG. 1A;

FIG. 4 is a view showing the state in which the shifting operation is effected in the sensor block of FIG. 3;

FIGS. 5A and 5B are diagrams showing the contrast in a selected field of view;

FIG. 6 is a diagram showing the setting of a field of view;

FIGS. 7A and 7B are diagrams for illustrating the minimum value in the operation of correlation;

FIG. 11 is a diagram showing the construction of a line sensor used for the conventional phase difference type focus detection method; and FIGS. 12A and 12B are diagrams showing the focus detection result obtained by use of the phase difference type focus detection method of FIG. 11.

DETAILED DESCRIPTION OF THE PREFERRED EMBODIMENTS

Figure 8A:
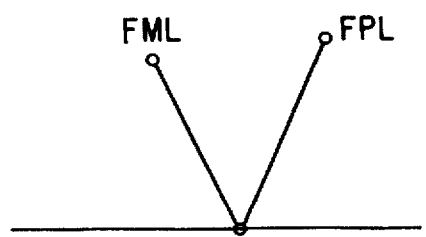
FIG. 8A is a diagram showing the minimum value of the correlation value.

Reference will now be made in detail to the presently preferred embodiments of the invention as illustrated in the accompanying drawings, in which like reference characters designate like or corresponding parts throughout the several drawings.

There will now be described embodiments of this invention with reference to the accompanying drawings.

FIG. 1A is a construction view of a camera using a focus detection apparatus according to one embodiment of this invention.

In FIG. 1A, a light beam from an object passing a photographing lens 11 mounted on a camera body 10 is reflected in an upward direction by approx. 90° by a mirror 12. The reflected light beam is further directed towards an eyepiece 15 via a screen 13 and pentagonal prism 14.

Part of the light beam passing the photographing lens 11 is divided in a direction towards a mirror 16. The light beam reflected from the mirror 16 is directed to a focus detection optical system 17 constructed by a visual field diaphragm, condenser lens, diaphragm mask and re-imaging lens and an image in position corresponding to the range-finding visual field is divided into two images by the optical system 17. An image sensor 18 constructed by a solid-state camera device such as a line sensor or CCD like the conventional case is arranged near the re-imaging surface which receives the two images formed by the focus detection optical system 17 to photoelectrically convert a received signal and transfer data to a controller 19 containing a microcomputer (CPU). The controller 19 containing the microcomputer (CPU) effects the focus detection operation based on detection data and drives the photographing lens 11 to a focused position via a driving control section (not shown) according to the result of the focus detecting operation.

FIG. 1B is a block diagram showing a concrete example of the controller 19 of FIG. 1A and the peripheral portion thereof.

The CPU 19a shown in FIG. 1B determines the states of switches 1R, 2R of a shutter button 8 and starts the range finding (focus detection) operation when the switch 1R is turned on.

The image sensor 18 receives a signal from the CPU 19a, photoelectrically converts the image of an object and stores the electrical signal for a preset period of time. After this, it sequentially outputs the storage signal to the AD conversion input of the CPU 19a.

The CPU 19a receives the signal, effects the range finding (focus detection) operation and causes a controller 5 to control the driving operation of the photographing lens driving motor 6. Further, the CPU 19a is connected to an EEPROM 3 which stores correction values and initial values and transfers necessary data with respect to the EEPROM 3.

The controller 5 controls the light emitting operation of an infrared light emitting diode 4 for emitting a range finding auxiliary light beam and the operation of an encoder 7 for detecting the lens driving amount in addition to the operation of the driving motor 6.

FIG. 2 is a flowchart for illustrating the operation effected after the starting of distance measurement operation for focus detection until the CPU 19a receives output data from the image sensor 18 and the focus detection result is obtained in the above camera.

First, the CPU 19a initializes the block (variable) BL in the range-finding visual field and the block shift amount Sa on the standard block L column side as will be described later in the image sensor 18. At this time, $C_{MIN1}$ is substituted for a contrast determination value $C_{MIN}$ (steps S1, S2). The CPU 19a effects the operation of correlation for the block BL as follows.

The CPU 19a divides the range-finding visual field shown on the L column (standard block 20L) of FIG. 3 into four portions ($20_1$ to $20_4$) and determines coordinate values La, Lb of both ends of the block. Then, the CPU 19a reads data values D(La) and D(Lb) of both ends of the block (step S3).

Next, the CPU 19a derives the maximum data value D(mx) and minimum data value D(mn) in the block and the coordinate values thereof when $C_{MIN}=C_{MIN1}$ and checks whether or not $S_{INN}=D(mx)-D(mn)$ giving the contrast value of the block is less than or equal to the contrast condition value $C_{MIN}$. At this time, the CPU 19a effects the contrast comparing operation for the second contrast level $C_{MIN2}$ as will be described later, and when the contrast which is larger than or equal to $C_{MIN2}$ is present for each block, a contrast flag C.FLG is set to "1" (steps S4 to S8).

When the sufficiently high contrast is obtained, the CPU 19a effects the shifting operation 1 (step S9). The shifting operation 1 is to determine the L column and R column by use of four values D(La), D(Lb) and D(mx), D(mn) on the four points according to the following equation.

$$SL(BL) = |D(La) - D(La+a)| + $$
$$|D(Lb) - D(Lb+a)| + $$
$$|D(mx) - D(mx+a)| + $$
$$|D(mn) - D(mn+a)|$$

where "a" indicates the distance between the two images and expresses a distance of the block position of the L column (20L) shown in FIG. 3 and a corresponding block position of the R column (reference block 20R). The CPU 19a changes the value of "a" from the position to a position set by shifting the position in the forward and backward directions by ±3 and effects the shifting operations by seven times in total for the block BL in the process of shifting operation 1. FIG. 3 shows a reference block L of sensors, and numeral 20 indicates outputs from the pixels of the sensors.

The CPU 19a stores the result of operation and the shifting position in position in which the correlation value obtained as the result of shifting operation is small, that is, the correlation degree is large into the internal memory thereof. The coordinate values La, Lb of both ends of the block are variables determined for each value of the block BL.

By the above operation, the CPU 19a terminates the shifting operation 1 for one block.

After completion of the shifting operation, or when $S_{INN}$ is smaller or equal to $C_{MIN}$, the CPU 19a starts the process for the next block BL (steps S10, S11). The CPU 19a effects the process for each of the blocks BL=0 to 3 in the same manner and derives the minimum value of correlation for each block and the shifting position set at this time.

Thus, until the operations for all of the blocks is completed, that is, when BL>3, the CPU 19a shifts the standard block L column by Sa=Sa+d (d=3 in this embodiment) (steps S12, S13). Then, the CPU 19a effects the operation of extracting characteristic points in the respective blocks after the step S2 and then effects the operation of correlation. The CPU 19a repeatedly effects the above operation until Sa becomes equal to Sastop, that is, it repeatedly effects the operation for the entire range of the standard portion 20L and reference portion 20R.

After the above operation is completed, the CPU 19a checks whether $F_{MIN}<1000$ or not when the minimum value of the correlation values derived for the respective blocks is set to $F_{MIN}$ (step S14). At this time, if it is detected that the condition of $F_{MIN}<1000$ is satisfied, the CPU 19a determines that the minimum value of the correlation value is detected, and effects the step S18 to select a field of view block by the method as will be described later. After this, the CPU 19a effects the shifting operation 2 based on the selected visual field and effects the interpolating operation by the method as will be described later (steps S19, S20). Then, the CPU 19a determines the reliability of the result of interpolation and determines the focused state or non-focused state based on the result of the reliability determination (steps S21 to S24).

If it is detected in the step S14 that the condition of $F_{MIN}<1000$ is not met, the CPU 19a determines that the contrast condition is bad and the operation of correlation is not effected and it changes $C_{MIN}$ to $C_{MIN2}$ which is the second contrast level and initializes Sa (steps S15, S16). After this, the CPU 19a effects the step S2 again and effects the same process as described above. When a low contrast is determined in step S15, a "non-focused" condition is set in step S17, and the processing is brought to an end.

As described above, by setting the contrast level in two stages, the operation can be more rapidly completed by effecting the calculation by setting the contrast determining level at a high level in a case wherein the object is an object whose contrast is sufficiently high as shown in FIG. 5A in comparison with a case of FIG. 5B and the correlation between the two images can be adequately obtained.

Further, after the contrast is changed to the second contrast level, the CPU 19a is only required to check whether the contrast flag C.FLG which is determined for each position of each block is set or not since whether the contrast of each block is sufficiently high or not is already determined as described above (step S7). Then, the CPU 19a effects the step S9 when the contrast is sufficiently high and effects the step S10 when the contrast is not sufficiently high.

FIG. 4 is a view showing the state in which the shifting operation is effected. Reference symbol 21R denotes R-side sensor arrays corresponding to the L-side sensor arrays 21L. When standard portion 21L is shifted by d, the maximum value and minimum value in the block of L column (21L) must be calculated again since the block is shifted. However, a variation in the L column caused by the shifting occurs only by an amount of d. Therefore, the maximum value and minimum value in the block after the shifting may be newly re-calculated only for the shifting amount d, and as a result, the scale of calculation can be made small.

First, the CPU 19a sequentially effects the operation of correlation for each block in the position of $21L_1$ for the L column and in the position of $21R_1$ for the R column. At this time, the CPU 19a effects the operation of correlation by seven times in total for each block. After this, it shifts only the L column to a position of $21L_2$ and then shifts the R column to a corresponding position of $21R_2$. The L and R columns are shifted with the columns kept in a corresponding positional relation and the operation of correlation is effected while the L and R columns are sequentially shifted to respective positions of $21L_n$ and $21R_m$ in which Sa=Sastop.

As shown in FIG. 6, three types of settings are made for the visual field block. That is, two blocks including a block indicating the minimum value and a block adjacent thereto are selected to define the correlation visual field. This is because the calculation cannot be correctly effected if the correlation is derived for the entire visual field since data items of objects at far and near distances are present in the same visual field when the visual field becomes wide, and in this case, it can be prevented that the number of picture elements becomes excessively large and time for calculations becomes excessively long in the specification with relatively high detection precision in the wide visual field.

In FIG. 6, a case of A indicates a field of view defined when the minimum value is detected in either of the two central blocks, a case of B indicates a field of view defined when the minimum value is detected in the right end block, and a case of C indicates a field of view defined when the minimum value is detected in the left end block.

For example, the minimum value of the correlation values is detected as shown in FIG. 7A, and when the correlation values F(S) of the respective blocks are compared and if the correlation value of the B block is detected to have the minimum value as shown in FIG. 7A, a block constructed by the two central visual fields is selected and the focused point is determined by effecting the interpolating calculation based on three points in the position Sa(2), Sb(2) giving the minimum value and positions before and after the position.

At this time, as shown in FIG. 7B, there occurs a case wherein the point giving the minimum value is not adequate. Such a case is determined when the minimum value is detected in the block D by the above-described method and a value which is smaller than the minimum value is detected as the result of calculation of values in positions before and after the position giving the minimum value. This is because an erroneous result may be sometimes derived based on the correlation of only the characteristic point, and such an erroneous result tends to occur in a low contrast portion of the object.

In such a case, the contrast of the block near the divided block may be low in many cases and it is understood that data which gives an extreme value cannot be obtained even if an amount of information is increased for determining the extreme value. In this case, a method of deriving data for interpolation for the block having a correlation value next to the minimum value without using the position giving the minimum value is provided.

As interpolation data, the correlation value $F_{MIN}$ giving the minimum value, the correlation value $F_M$ shifted by $-1$ from $F_{MIN}$ and the correlation value $F_P$ shifted by $+1$ from $F_{MIN}$ can be derived by the following equations.

$$F_{MIN}=\Sigma|L(i+S)-R(i+S)|$$

$$F_M=\Sigma|L(i+S)-R(i+S-1)|$$

$$F_P=\Sigma|L(i+S)-R(i+S+1)|$$

The above correlation value is a value obtained as the result of cross-correlation between the standard block and reference block and contains errors contained in both of data items thereof and an error caused by the difference calculation. When taking a variation in the position in which the correlation degree becomes minimum into consideration and if two images are ideal images, the correlation value in the focused position obtained by interpolation becomes 0. That is, a variation derived by the self-correlation of the standard image indicates the same characteristic as a variation derived by the cross-correlation.

Figure 8B:
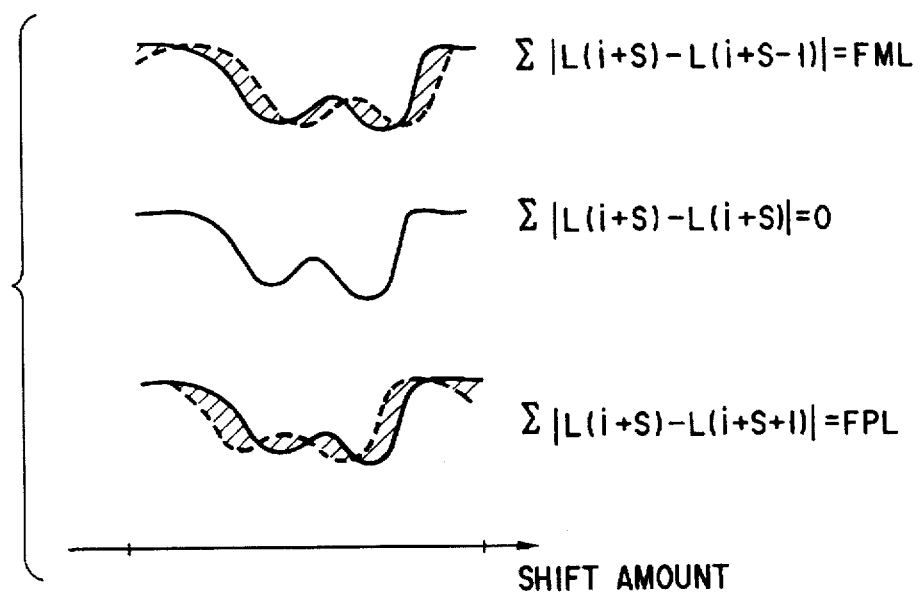
FIG. 8B is a diagram showing the self-correlation of a standard image in positions before and after the position corresponding to the position in which the value of derived cross-correlation is minimum.
Figure 8C:
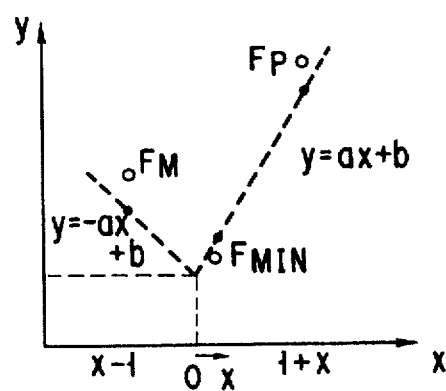
FIG. 8C is a diagram showing the inclination at the minimum value of the correlation value and the inclinations set before and after the minimum value.

Straight lines indicating 0 at the minimum point and respectively having the inclinations of $-FML$ and $+FPL$ before and after the minimum point as shown in FIG. 8C can be obtained if the self-correlations of the standard image obtained as shown in FIG. 8B in positions before and after a position corresponding to the derived minimum position of the cross-correlation with respect to the position of the standard block indicating the minimum value of the correlation value as shown in FIG. 8A are expressed by the following equations.

$$FML=\Sigma|L(i+S)-L(i+S-1)|$$

$$FPL=\Sigma|L(i+S)-L(i+S+1)|$$

At the time of error=0, ideally, a variation near the minimum value derived by the cross-correlation follows the above straight line. If an error is contained, the absolute value of data at each point fluctuates, and as the result of interpolation, the correlation value in position giving the minimum value does not become 0 and has a positive value.

At least an error contained in the inclination derived by the self-correlation is considered to be ideal for the standard image. Therefore, it is considered as a premise that errors are contained in data in three points derived by the cross-correlation and the interpolation is effected by the method of least squares between the above straight lines and the three points. That is, the condition in which the error is set to minimum is derived based on the sum of squares of differences between the equation of the straight line derived by the self-correlation and the three points derived by the cross-correlation. Partial differential is derived for unknown quantity parts of the equation of the straight line and a straight line in which the error is determined to be minimum in a condition that each of the partial differential values is set to 0 is derived.

Strictly speaking, FPL and FML are different values, but for simplifying the calculation, if variations before and after the inflection point are expressed by use of the inclination of the line passing two points among the three points, the deviation amount can be expressed as follows.

In the case of $F_M \leq F_P$, $$ZR=ZR_0-(FPL-2\times F_M+F_{MIN}+F_P)/(4\times FPL).$$

In the case of $F_M > F_P$, $$ZR=ZR_0+(FML-2\times F_P+F_{MIN}+FM)/(4\times FML).$$

Figure 9:
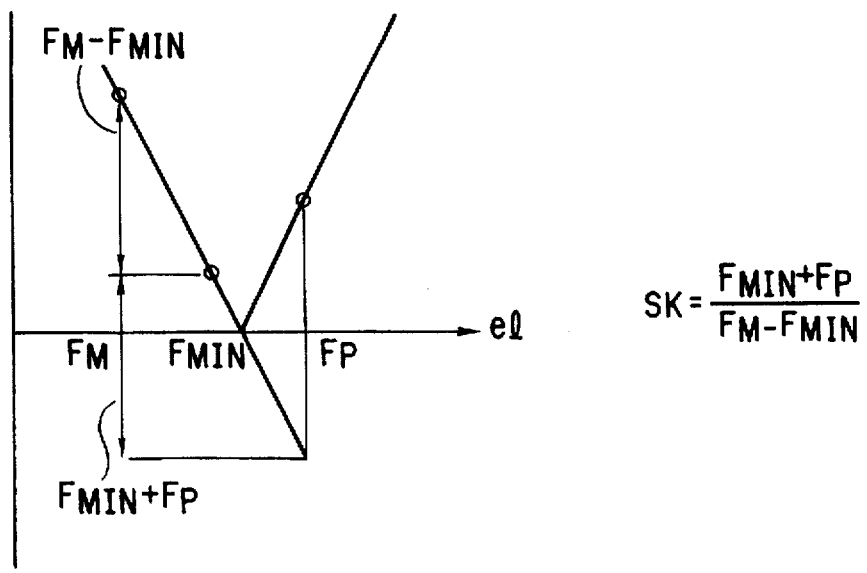
FIG. 9 is a diagram for illustrating determination of reliability of the inclination derived by the self-correlation.

After this, in order to determine the reliability of the derived value, the reliability determination as shown in FIG. 9 is effected, and if the derived value is larger than a preset value, it is determined that substantially no reliability is obtained and the non-focused state is set. When the sufficiently high reliability is obtained, it is determined that the focused state is set and the detection sequence is completed.

The reliability can be calculated by use of the values $F_{MIN}$, $F_M$ and $F_P$ on the three points used for interpolation according to the following equations.

In the case of $F_M > F_P$, $$SK=(F_{MIN}+F_P)/(F_M-F_{MIN})$$

In the case of $F_M \leq F_P$, $$SK=(F_{MIN}+F_M)/(F_P-F_{MIN}).$$

If the value is not larger than 7, it is determined that the reliability of the result of the calculation is high and the deviation amount derived by the calculation is used.

Next, a second embodiment of this invention is explained.

In the interpolation method described in the first embodiment, the single inclination is used for simplicity of the equation. In the second embodiment, a case wherein two inclinations, that is, both of FML and FPL are used is considered. In this case, the deviation amount can be expressed as follows.

In the case of $F_M \leq F_P$, $$ZR=ZR_0-(2 \times FML-FPL+F_{MIN}+F_P)/2/(FPL+FML).$$

In the case of $F_M > F_P$, $$ZR=ZR_0+(2 \times FPL-FML-2 \times F_P+F_{MIN}+F_M)/2/(FPL+FML).$$

According to the second embodiment, the equations become complicated, but the error is reduced.

Next, a third embodiment of this invention is explained.

In the interpolation method described in the above embodiment, the interpolation based on the three points is effected by the regression calculation. In this case, if the S/N ratio of the signal is low, the values $F_M$, $F_{MIN}$ and $F_P$ on the three points used for interpolation are low in the reliability.

Figure 10:
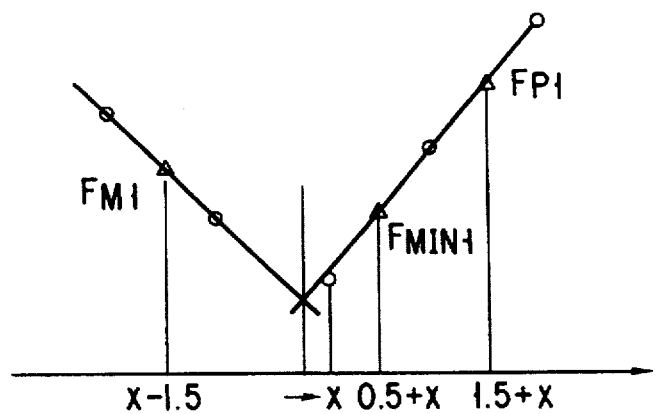
FIG. 10 is a diagram showing an example in which values at three points are derived based on correlation values at five points.

Therefore, in the third embodiment, in order to cope with errors contained in the three points, correlation values in positions separated by an amount of ±2 picture elements from the position giving the minimum value of the correlation calculation are also used. The correlation values in the above positions are set to $F_{M2}$ and $F_{P2}$ and the values for the three points are derived by deriving the average values based on the correlation values of the five points as shown in FIG. 10. In FIG. 10, a case of $F_M \leq F_P$ is shown.

In the case of FIG. 10, if the average values are set to $F_{M1}$, $F_{MIN}$ and $F_{P1}$, the average values are newly derived by the following equations.

$$F_{M1}=(F_{M2}+F_M)/2$$

$$F_{MIN1}=(F_{MIN}+F_P)/2$$

$$F_{P1}=(F_P+F_{P2})/2$$

Then, the focused position is derived by the above three points and the inclination derived by the self-correlation. The same concept as in the first embodiment is used for the inclination obtained at this time.

The deviation amount at this time can be expressed as follows.

In the case of $F_M \leq F_P$, $$ZR=ZR_0-(FPL-2 \times F_{M2}+F_{MIN1}+F_{P2})/(4 \times FPL).$$

In the case of $F_M > F_P$, $$ZR=ZR_0+(FML-2 \times F_{P2}+F_{MIN1}+F_{M2})/(4 \times FML).$$

In this system, since the error of the cross-correlation can be reduced, the effect for noises can be further enhanced.

As described above, according to this invention, the influence by the error caused between two images can be reduced by deriving the correlation degree in position near the position in which the highest correlation is obtained based on the result of self-correlation when the similarity between the two images is derived, and the focus detection with high precision can be attained by use of the simple regression interpolation equation even when the condition of the object is bad by deriving the result of cross-correlation containing the error based on the above characteristic by the regression calculation.

Since the correlation is derived only for a portion with relatively high contrast if the object has sufficiently high contrast when the calculation of correlation is effected and the correlation is derived by additionally using a portion with relatively low contrast if the contrast of the object is low, the result of focusing can be rapidly obtained according to the condition of the object and the smooth AF operation can be attained.

Further, the focus detection can be attained with high precision without being influenced by information of the object containing a distance view and a close-range view even in the case of wide field of view by dividing the field of view into a plurality of blocks and deriving the degree of correlation between the two images for each block when the focus detection is effected in the case of wide field of view, selecting blocks including at least a block whose correlation degree is determined to be highest and effecting the interpolation calculation for the selected blocks.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A focus detection apparatus for a camera including photoelectric conversion means for receiving two images formed from a light beam from an object, said photoelectric conversion means having a linear sensor array and outputting two image signals corresponding to the received two images, said focus detection apparatus comprising:

first operation means for defining an operation range of the two image signals output by said photoelectric conversion means and for deriving an amount of deviation between the two received images, said operation range being a predetermined fixed size, and said amount of deviation being derived by effecting a correlation operation between the two image signals output from said photoelectric conversion means while shifting the two image signals sequentially at high speed in a predetermined direction in a first cycle, and by effecting the correlation operation in the operation range of the two image signals in a next cycle;

second operation means for deriving a self correlation value of one of the two image signals output from said photoelectric conversion means; and third operation means for interpolating by approximating linear regression an amount of deviation between the two images based on at least a portion yielding a minimum value of an operation result of said first operation means and an operation result of said second operation means.

2. A focus detection apparatus according to claim 1, wherein said third operation means includes means for determining a position in which a deviation amount yielding a best operation result of said first operation means is obtained, and for determining at least one of inclinations of operation values in positions before and after said position.

3. A focus detection apparatus according to claim 1, wherein said third operation means includes means for determining a first position in which a deviation amount yielding a largest similarity derived by said first operation means is obtained, and means for determining a position in which an error with respect to the operation result of said first operation means is set to a minimum value as an inclination of an operation value for the operation result of said first operation means for deviation amounts in positions before and after said first position.

4. A focus detection apparatus according to claim 1, wherein said third operation means includes means for determining a first position in which a deviation amount yielding a largest similarity derived by said first operation means is obtained, and means for determining a position in which an error with respect to the operation result of said first operation means is set to a minimum value as an inclination of an operation value for an average value of values on two points before and after said first position.

5. A focus detection apparatus according to claim 1, wherein said third operation means includes means for interpolating by approximating linear regression the amount of deviation between the two images based on at least three points yielding the minimum value of the operation result of said first operation means, a .correlation value of a portion adjacent to the portion yielding the minimum value, and an inclination thereof.

6. A focus detection apparatus for a camera including photoelectric conversion means for receiving two images formed from a light beam from an object, said photoelectric conversion means having a linear sensor array and outputting two image signals corresponding to the received two images, said focus detection apparatus comprising:

correlation operation means for comparing similarities of the electrical signals output from said photoelectric conversion means to evaluate a deviation amount between the two images while sequentially shifting the two images in a predetermined direction by a fixed shift amount;

contrast determining means for detecting a contrast state of one of the electrical signals output from said photoelectric conversion means and for determining the contrast state by use of a plurality of levels; and operation means for deriving a deviation amount between the two images according to an output from said correlation operation means and an output from said contrast determining means, said operation means including cross-correlation deriving means for deriving a cross-correlation value of the two image signals, self-correlation deriving means for deriving a self-correlation value of one of the two image signals, and interpolation operation means for effecting an interpolation operation by approximating linear regression for a deviation amount obtained by said cross-correlation deriving means based on an operation result of said self-correlation deriving means.

7. A focus detection apparatus for a camera including photoelectric conversion means for receiving two images formed from a light beam from an object, said photoelectric conversion means having a linear sensor array and outputting two image signals corresponding to the received two images, said focus detection apparatus comprising:

dividing means for uniformly dividing one of the two image signals output from said photoelectric conversion means into a plurality of blocks of predetermined fixed size in a predetermined direction;

shift operation means for sequentially comparing the image signal divided into the plurality of blocks and the other image signal corresponding thereto based on a plurality of characteristic points extracted from the divided image signal and values on both ends of the plurality of blocks, and for outputting a similarity between the two image signals while shifting the two image signals in the predetermined direction by a fixed shift amount;

selection means for selecting at least a block yielding a minimum operation result of said shift operation means and a block adjacent to said block; and interpolation operation means for interpolating by approximating linear regression a deviation amount between the two images according to an output from said shift operation means and the blocks selected by said selection means.

8. An apparatus according to claim 7, wherein said plurality of characteristic points include at least a maximum value or minimum value in the block.

9. A focus detection apparatus for a camera including photoelectric conversion means for receiving two images formed from a light beam from an object, said photoelectric conversion means having a linear sensor array and outputting two image signals corresponding to the received two images, said focus detection apparatus comprising:

first operation means for deriving an amount of deviation between the two images by comparing similarities of the two image signals output from said photoelectric conversion means while sequentially shifting the two image signals in a predetermined direction by a fixed shift amount;

second operation means for outputting a signal corresponding to an inclination of the amount of deviation based on one of the two image signals in a position in which the amount of deviation derived by said first operation means is indicated; and third operation means for interpolating by approximating linear regression an amount of deviation between the two images based on an output of said first operation means and an output of said second operation means.

10. A focus detection apparatus for a camera including photoelectric conversion means for receiving two images formed from a light beam from an object, said photoelectric conversion means having a linear sensor array and outputting two image signals corresponding to the received two images, said focus detection apparatus comprising:

dividing means for uniformly dividing one of the two image signals output from said photoelectric conversion means into a plurality of blocks of predetermined fixed size in a predetermined direction;

extraction means for extracting a plurality of characteristic signals from the one of the two image signals divided by said dividing means;

determining means for determining contrasts in each of the plurality of blocks by use of a plurality of levels; and operation means for comparing similarities between the two images with respect to each of the plurality of blocks based on the plurality of characteristic signals extracted by said extraction means to detect a portion in which a deviation amount yielding a largest similarity is obtained, said operation means including cross-correlation deriving means for deriving a cross-correlation value of the two image signals, self-correlation deriving means for deriving a self-correlation value of one of the two image signals, and interpolation operation means for effecting an interpolation operation by approximating linear regression for a deviation amount obtained by said cross-correlation deriving means based on an operation result of said self-correlation deriving means.

11. A focus detection apparatus according to claim 10, wherein said determining means has a first determination level and a second determination level lower than the first determination level, and said determining means includes means for comparing an image signal with the second determination level when comparing the image signal with the first determination level, and means for outputting the result of comparison with the second determination level when the image signal does not reach the first determination level.

12. A focus detection apparatus for a camera including photoelectric conversion means for receiving two images formed from a light beam from an object, said photoelectric conversion means having a linear sensor array and outputting two image signals corresponding to the received two images, said focus detection apparatus comprising:

dividing means for uniformly dividing one of the two image signals output from said photoelectric conversion means into a plurality of blocks of predetermined fixed size in a predetermined direction;

extraction means for extracting characteristic signals from the one of the two image signals divided by said dividing means;

shift operation means for comparing similarities between the two images based on the characteristic signals extracted by said extraction means and values on both ends of the plurality of blocks while sequentially shifting the two image signals in the predetermined direction by a fixed shift amount;

selection means for selecting blocks including at least a block in which a correlation value representing a similarity of the block compared by said shift operation means becomes minimum;

means for merging two selected blocks adjacent to each other into one new block; and interpolation operation means for interpolating by approximating linear regression a deviation amount between the two images based on an operation result of said shift operation means, and the blocks selected by said selection means and merged by said synthesis means.

13. A focus detection apparatus according to claim 12, wherein said selection means includes means for selecting a block which yields the minimum correlation value and a block adjacent thereto.

14. A focus detection apparatus according to claim 12, wherein said selection means includes means for selecting a block which yields the minimum correlation value and a block adjacent thereto and near a central portion of field view.

15. A focus detection apparatus according to claim 12, further comprising means for determining that the blocks selected by said selection means are inadequate, and wherein said interpolation operation means includes means for interpolating by approximating linear regression a deviation amount based on another block which is selected by said selection means and which has a second largest similarity.

16. A focus detection apparatus for a camera including photoelectric conversion means for receiving a pair of images formed from a pair of light beams from an object which are symmetrical with respect to an optical axis of a photographing lens of the camera, said photoelectric conversion means having a linear sensor array and outputting two image signals corresponding to the pair of received images of the object, said focus detection apparatus comprising:

field view block dividing means for extracting preset areas of the two image signals output from said photoelectric conversion means and for dividing one of the two image signals into a plurality of field view blocks of predetermined fixed size;

characteristic extraction means for extracting four values including values of both ends of each block, a maximum value in each block and a minimum value in each block for each of the plurality of field view blocks;

contrast evaluation means for comparing a difference between the maximum value and the minimum value in each block with a plurality of preset levels for each of the plurality of field view blocks;

first shift operation means for effecting a preset shift operation to evaluate a similarity between the pair of images of the object based on the four values extracted by said characteristic extraction means and a distance between preset standard two images;

field view block selection means for selecting a block containing a portion having a largest similarity and one of two blocks adjacent thereto based on an operation result of said first shift operation means;

second shift operation means for deriving a similarity between the two image signals of the selected two blocks while shifting the two image signals relative to each other by a fixed shift amount and for deriving an amount of deviation between the pair of images of the object based on a portion having the largest similarity;

interpolation operation means for effecting an interpolation operation by approximating linear regression to determine an amount of deviation between the pair of images of the object based on at least a position yielding a minimum value of an operation value derived by said second shift operation means and operation values in positions before and after said position yielding the minimum value; and deviation amount outputting means for outputting an operation result of said interpolation operation means as a focus deviation amount.

17. An apparatus according to claim 16, wherein said interpolation operation means includes means for selecting one of two portions before and after a portion having the largest similarity and derived by said second shift operation means according to a result of comparison of operation results obtained before and after the portion having the largest similarity, and means for effecting the interpolation operation by approximating linear regression for an amount of deviation between the pair of images of the object based on the selected portion, a similarity of the portion with the largest similarity, and a contrast value of said one image determined by said contrast evaluation means in a portion corresponding to the selected portion.

18. An apparatus according to claim 16, wherein said interpolation operation means includes means for effecting the interpolation operation by approximating linear regression for an amount of deviation between the pair of images of the object based on a portion with the largest similarity, similarities of portions before and after the portion with the largest similarity, and contrast values of portions corresponding to preceding and succeeding portions in said one image determined by said contrast evaluation means according to a result of comparison of operation results obtained before and after the portion of the largest similarity derived by said second shift operation means.

19. An apparatus according to claim 16, wherein said interpolation operation means includes means for effecting the interpolation operation by approximating linear regression for an amount of deviation between the pair of images of the object based on a portion with the largest similarity, similarities of portions before and after the portion with the largest similarity, preceding and succeeding portions, and contrast values of portions corresponding to the preceding and succeeding portions in said one image determined by said contrast evaluation means according to a result of comparison of operation results obtained before and after the portion of the largest similarity derived by said second shift operation means.

20. An apparatus according to claim 16, wherein said contrast evaluation means has two determination levels and includes means for initially setting a higher one of the two determination levels and means for changing the determination level to a lower one of the two determination levels when the similarity derived by said first shift operation means does not reach a preset value.

21. A focus detection apparatus for a camera including photoelectric conversion means for receiving a pair of images formed from a pair of light beams from an object which are symmetrical with respect to an optical axis of a photographing lens of the camera, said photoelectric conversion means having a linear sensor array and outputting two image signals corresponding to the pair of received images of the object, said focus detection apparatus comprising:

determination means for determining contrast states of the two image signals output from said photoelectric conversion means by dividing one of the two image signals into a plurality of blocks of predetermined fixed size;

selection means for selecting an adequate area of the two image signals in the predetermined direction according to an output of said determination means; and operation means for effecting a correlation operation for the two image signals based on the area selected by said selection means to derive a deviation amount, said operation means including cross-correlation deriving means for deriving a cross-correlation value of the two image signals, self-correlation deriving means for deriving a self-correlation value of one of the two image signals, and interpolation operation means for effecting an interpolation operation by approximating linear regression for a deviation amount obtained by said cross-correlation deriving means based on an operation result of said self-correlation deriving means.

22. An apparatus according to claim 21, wherein said determination means includes means for determining the contrast level of a preset area of the two image signals in the predetermined direction.

23. An apparatus according to claim 21, wherein said selection means includes means for changing the range of the correlation operation performed by said operation means when said determination means determines that the contrast value of the preset area is not higher than a preset value.

24. An apparatus according to claim 21, wherein said interpolation operation means includes means for effecting the interpolation operation by approximating linear regression based on a position yielding a minimum cross-correlation value and at least cross-correlation values in positions before and after said position yielding the minimum cross-correlation.

25. A focus detection apparatus having a phase difference detection system wherein a phase difference between two images formed from a light beam from an object to be photographed is detected, said focus detection apparatus comprising:

mutual-correlation operation means for comparing similarities of the two images, for calculating an amount of deviation corresponding to a largest one of the similarities, and for outputting a plurality of signals which represent an amount of deviation;

self-correlation operation means for deriving a feature signal corresponding to an amount of deviation from a signal pertaining to a reference image included among signals output by the mutual-correlation operation means; and interpolating operation means for performing an interpolating operation by approximating linear regression to detect how the two images deviate from each other on the basis of operation results of said mutual-and self-correlation operation means.

26. A focus detection apparatus having a phase difference detection system wherein a phase difference between two images formed from a light beam from an object to be photographed is detected, said focus detection apparatus comprising:

feature point-extracting means for extracting feature points representing features of the two images from reference portions of the two images, and for outputting signals representing a degree of similarity of the two images, said degree of similarity being determined by shifting the two images in a predetermined direction by a fixed shift amount;

comparison operation means for comparing similarities between the two images on the basis of the signals output by the feature point-extracting means and for determining an amount of deviation corresponding to a largest one of the similarities; and interpolation operation means for performing an interpolating operation by approximating linear regression with respect to the amount of deviation determined by said comparison operation means.

27. A focus detection apparatus having a phase difference detection system wherein a phase difference between two images formed from a light beam from an object to be photographed is detected and wherein image signals corresponding to the light beam from the object to be photographed are output, said focus detection apparatus comprising:

reference block-dividing means for dividing a block, which is included among the image signals and which serves as a reference signal portion, into a plurality of blocks of predetermined fixed size;

feature point-extracting means for extracting feature points representing features of an image from image signals of each of the blocks produced by the reference block-dividing means, and for outputting signals representing a degree of similarity of the image signals, said degree of similarity being determined by shifting the two images in a predetermined direction by a fixed shift amount;

comparison operation means for performing a similarity comparison between the two image signals on the basis of the signals output by the feature point-extracting means for each of the blocks produced by the reference block-extracting means, and for determining an amount of deviation corresponding to a largest one of the similarities;

block-selecting means for selecting a plurality of blocks from among the blocks produced by the references block-dividing means such that said selected plurality of blocks include a block from which the amount of deviation corresponding to the largest similarity is detected; and interpolation operation means for performing an interpolating operation by approximating linear regression with respect to the amount of deviation determined by said comparison operation means on the basis of image signals detected from the blocks selected by said block-selecting means.

28. A focus detection apparatus having a phase difference detection system wherein a phase difference between two images formed from a light beam from an object to be photographed is detected and wherein image signals corresponding to the light beam from the object to be photographed are output, said focus detection apparatus comprising:

reference block-dividing means for dividing a block, which is included among the image signals and which serves as a reference portion, into a plurality of blocks of predetermined fixed size;

feature point-extracting means for extracting feature points representing features of an image from image signals of each of the blocks produced by the reference block-dividing means, and for outputting signals representing a degree of similarity of the image signals;

first contrast-determining means for detecting a contrast from the signals output by the feature point-extracting means for each of the blocks and for determining whether the detected contrast satisfies a first contrast value;

second contrast-determining means for detecting a contrast from the signals output by the feature point-extracting means for each of the blocks and for determining whether the detected contrast satisfies a second contrast value which is smaller than the first contrast value;

comparison operation means for performing a similarity comparison operation on the image signals on the basis of the signals output by the feature point-extracting means for each of the blocks produced by the reference block-dividing means and for obtaining an amount of deviation corresponding to a largest one of the similarities when at least one of said first and second contrast-determining means detects a satisfactory contrast; and interpolation operation means for performing an interpolating operation by approximating linear regression with respect to the amount of deviation determined by said comparison operation means;

wherein said second contrast-determining means detects a contrast simultaneously with said first contrast-determining means, and said comparison operation means performs the similarity comparison operation on the basis of a satisfactory contrast detected by said second contrast means when said first contrast-determining means does not detect a satisfactory contrast.

* * * * *